(12) United States Patent
Griffin (10) Patent No.: US 8,412,148 B2
(45) Date of Patent: Apr. 2, 2013

(54) LOCATION-BASED ALARM SYSTEM WITH FOREWARNING CAPABILITY

(75) Inventor: Jason Griffin, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 616 days.

(21) Appl. No.: 11/552,780

(22) Filed: Oct. 25, 2006

(65) Prior Publication Data

US 2008/0102786 A1    May 1, 2008

(51) Int. Cl.
*H04M 11/04* (2006.01)
(52) U.S. Cl. ............... 455/404.1; 455/404.2; 455/414.2; 455/456.1; 455/456.3; 455/457; 340/426.2; 340/426.18; 340/539.1; 340/539.13
(58) Field of Classification Search ............... 340/426.2, 340/426.18, 426.19, 539.1, 539.13, 825.36, 340/825.49, 990–994; 379/207.12; 455/404.2, 455/414.1, 414.2, 457, 456.1–456.6
See application file for complete search history.

(56) References Cited

U.S. PATENT DOCUMENTS

| | | | | |
|---|---|---|---|---|
| 6,590,507 | B2 * | 7/2003 | Burns | 340/995.13 |
| 6,952,645 | B1 * | 10/2005 | Jones | 701/201 |
| 6,975,873 | B1 * | 12/2005 | Banks et al. | 455/456.5 |
| 7,116,977 | B1 | 10/2006 | Moton, Jr. et al. | |
| 2001/0005171 | A1 | 6/2001 | Farringdon et al. | |
| 2002/0086680 | A1 | 7/2002 | Hunzinger | |
| 2002/0089421 | A1 * | 7/2002 | Farringdon et al. | 340/506 |
| 2004/0095239 | A1 * | 5/2004 | Schwartz et al. | 340/539.13 |
| 2004/0156326 | A1 * | 8/2004 | Chithambaram | 370/310 |
| 2004/0183674 | A1 * | 9/2004 | Ruvarac | 340/539.13 |
| 2004/0207522 | A1 * | 10/2004 | McGee et al. | 340/539.13 |
| 2005/0043037 | A1 | 2/2005 | Ioppe et al. | |
| 2005/0136942 | A1 * | 6/2005 | Timiri et al. | 455/456.1 |
| 2005/0186977 | A1 | 8/2005 | Chiu et al. | |
| 2006/0040640 | A1 * | 2/2006 | Thompson et al. | 455/404.2 |
| 2006/0121912 | A1 | 6/2006 | Borjesson | |
| 2006/0164259 | A1 * | 7/2006 | Winkler et al. | 340/944 |
| 2007/0210936 | A1 * | 9/2007 | Nicholson | 340/988 |
| 2008/0171559 | A1 * | 7/2008 | Frank et al. | 455/456.5 |

FOREIGN PATENT DOCUMENTS

| | | |
|---|---|---|
| EP | 1 008 946 A1 | 6/2000 |
| JP | 2000311145 | 11/2000 |
| JP | 2003154938 | 5/2003 |
| WO | WO0110143 A1 | 2/2001 |
| WO | WO0195056 A3 | 12/2001 |
| WO | WO0251193 A1 | 6/2002 |
| WO | WO02076136 A1 | 9/2002 |

OTHER PUBLICATIONS

Canadian Office Action dated Jan. 23, 2012 for corresponding Canadian Patent application No. 2,607,707.

* cited by examiner

*Primary Examiner* — Kiet Doan
*Assistant Examiner* — Dung Lam
(74) *Attorney, Agent, or Firm* — Gowling Lafleur Henderson LLP (57) ABSTRACT

A wireless communications device includes a location-dependent alarm which a user can set to be triggered at a target location. A GPS receiver embedded in the wireless device provides position data representative of the current location. When the current location matches the target location, the alarm is triggered. This enables the user to set the alarm to wake him upon arrival at a particular location, e.g. a specific station on a commuter train. In another example, the wireless device can wake the user at one time of morning if the user is sleeping in one location and at a second time if the user is sleeping in a second location.

11 Claims, 7 Drawing Sheets

_LOCATION-BASED ALARM SYSTEM WITH FOREWARNING CAPABILITY_

TECHNICAL FIELD

The present invention relates generally to wireless communications devices and, in particular, to wireless communications devices having location-tracking capabilities.

BACKGROUND

Most handheld wireless communications devices, such as the BlackBerry™ by Research in Motion Limited, now have an alarm which a user can set to alert the user at a pre-selected time, usually by a sound or vibration.

The alarm functionality can be provided by a calendaring application such as MS Outlook™ which enables the user to set an alarm for an event by entering the time at which the event is scheduled to occur or, more commonly, to set the alarm to go off a certain period of time prior to the event. Furthermore, these calendaring applications enable the user to set a plurality of alarm times corresponding to various events during the day or night or to make certain alarms recur at regular intervals through the calendar (corresponding to regularly recurring events).

In addition to, or in lieu of, the full-feature calendaring application, some wireless communications devices include a very simple alarm clock function that allows a user to specify an alarm type (sound or vibration) and a time for triggering the alarm, thus mimicking the simple functionality of a portable alarm clock.

The foregoing technologies, be it the full-blown calendaring application or the simple alarm clock feature, require that the user of the wireless communications device set an alarm by specifying the precise time at which the user is to be alerted. For example, the user of the wireless device can set the alarm to wake up the user at a particular time in the morning or after a nap.

In some instances, however, such as napping on a commuter train, bus or subway, merely setting an alarm based on an expected or predicted time of arrival does not always guarantee that the alarm will sound when the user has actually reached the desired destination due to the possibility that the train, bus or subway is delayed (or that is arrives ahead of schedule at the desired destination). A wireless communications device that addresses this problem would be highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION OF THE EMBODIMENTS

The present technology provides a wireless communications device having an alarm that is responsive to location. In general, the wireless communications device has a position data module such as an onboard GPS receiver, that generates position data representative of the current location of the device. The device periodically or intermittently compares the current location with the target location, and if the current and target locations match, the alarm is triggered. Setting the target location can be accomplished, for example, by entering longitude and latitude data, selecting one of a plurality of predetermined positions, indicating the target location on a map displayed on a graphical user interface of the device, or graphically enclosing a zone on the map.

Thus, an aspect of the present technology provides a method of alerting a user of a wireless communications device. The method includes steps of enabling the user to set an alarm to be triggered when the device is in a target location, determining a current location of the device, comparing the current location of the device with the target location, and triggering the alarm when the current location of the device matches the target location.

Another aspect of the present technology provides a wireless communications device having a location-dependent alarm. The wireless communications device includes an input device for enabling the user to set the alarm by specifying a target location for triggering the alarm, a position data module, e.g. a GPS receiver, for generating position data representative of a current location of the device, and a processor for comparing the position data with the target location and for triggering the alarm when the position data corresponds to the target location.

Yet another aspect of the present technology provides a method of enabling a user of a wireless communications device to remotely alert an alarm recipient based on a current location of the user. The method includes steps of enabling the user to set an alarm to be triggered when the device is in a target location, determining a current location of the device, comparing the current location of the device with the target location, and communicating the alarm to the alarm recipient when the current location of the device matches the target location.

Figure 1:
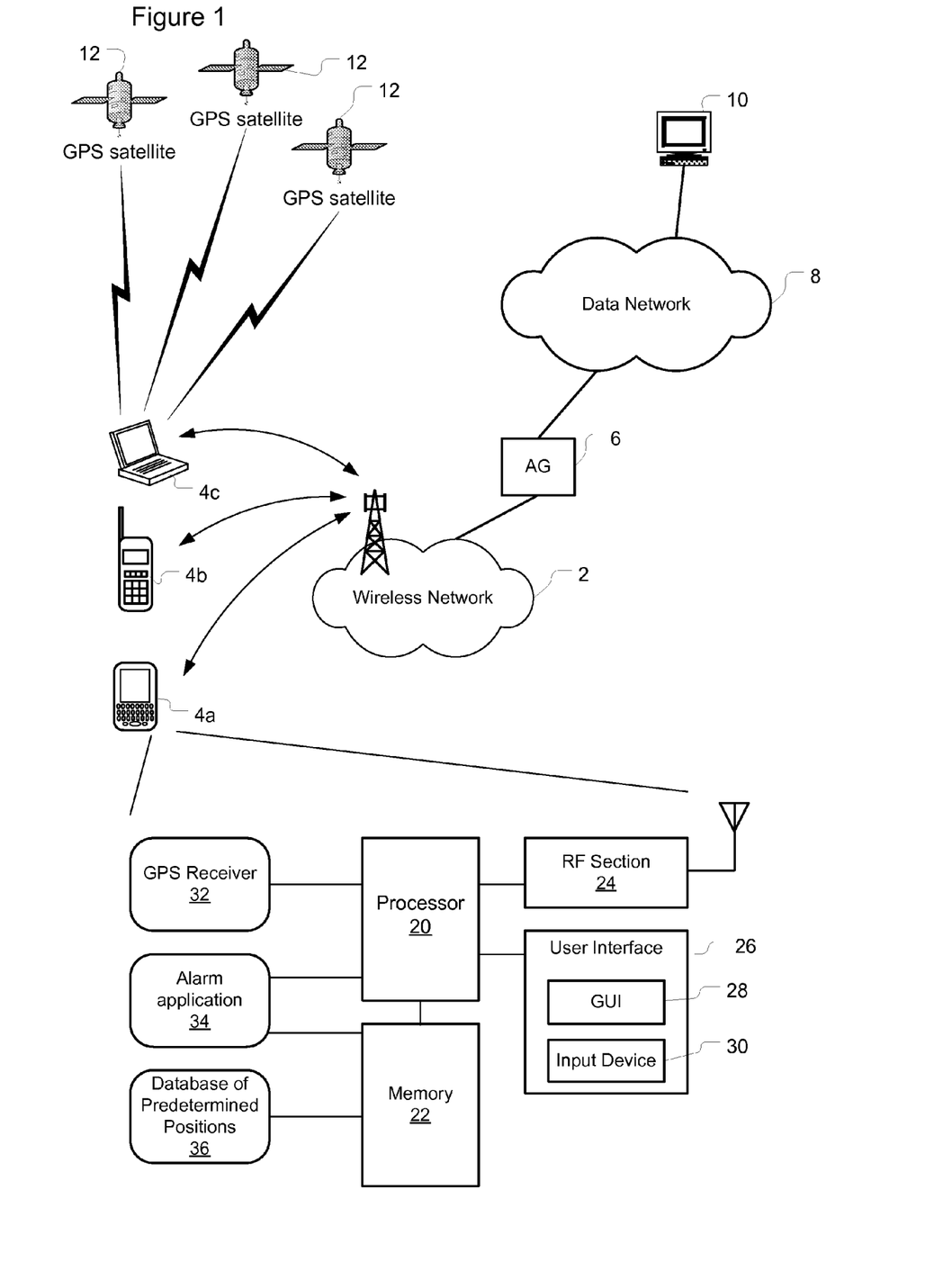
FIG. 1 is a schematic illustration of a system enabling wireless devices to trigger location-dependent alarms.

FIG. 1 schematically illustrates a system enabling wireless devices to trigger location-dependent alarms. As will be elaborated below, a user of the wireless device can set an alarm on the device to be triggered when the device is positioned in a specific location, referred to herein as the "target location".

As depicted in FIG. 1, a wireless network 2 hosts a plurality of wireless devices including, by way of example only, a handheld wireless communications device 4*a* (such as the Blackberry™ by Research in Motion Limited) having voice and data capabilities (for both e-mail and web browsing) as well as a full QWERTY keyboard, a cell phone 4*b*, or a wireless-enabled laptop computer 4*c*. For the purposes of the present specification, the expression "wireless communications device" encompasses not only a wireless handheld, cell phone or wireless-enabled laptop but also any portable communications device such as a satellite phone. In other words, for the purposes of this specification, "wireless" shall be understood as encompassing not only standard cellular or microwave RF technologies, but also any other communications technique that conveys data over the air using an electromagnetic signal. As shown in FIG. 1, these wireless devices 4a-4c can access data services 10 hosted on a data network 8 (e.g. the Internet) via an applications gateway (AG) 6 which mediates data flow between the wireless network 2 and the data network 8.

In general, as shown in FIG. 1, each wireless communications device 4a has a processor 20, a memory 22 (including both volatile and non-volatile memory), an RF section 24 and a user interface 26 that includes both a graphical user interface (GUI) 28, e.g. an LCD display, and an input device 30 (e.g. a full QWERTY keyboard, a keypad, a thumbwheel, a mouse, a trackball, etc.)

As further shown in FIG. 1, a plurality of GPS satellites 12 provides position data to each of the GPS-enabled wireless devices 4a-4c. As shown in FIG. 1, the wireless communication devices 4a has a Global Positioning System (GPS) receiver 32 (i.e. a "GPS chip") embedded within the device to enable the device to receive and process signals transmitted from the GPS satellites 12. The GPS receiver 32 generates latitude and longitude coordinates ("position data") representative of a current location of the device.

Although GPS represents the best mode of implementing this technology presently known to the applicant(as), the wireless communications device could determine its location using another technique such as triangulation of signals from in-range base towers, such as used for Wireless E911. As is known in the art, Wireless Enhanced 911 services enable a cell phone or other wireless device to be located geographically using radiolocation techniques such as (i) angle of arrival (AGA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell.

As further shown in FIG. 1, an alarm application 34, which is stored in the memory 22 of the device and executable by the processor 20, provides various alarm functionality enabling the user of the device to set the alarm by specifying the target location where the alarm is to be triggered. As will be elaborated below, the user can specify the target location by entering coordinates of latitude and longitude, by selecting a position or zone on a map, or by selecting a predetermined position from a database of predetermined positions 36 stored in the memory 22 of the device.

Figure 2:
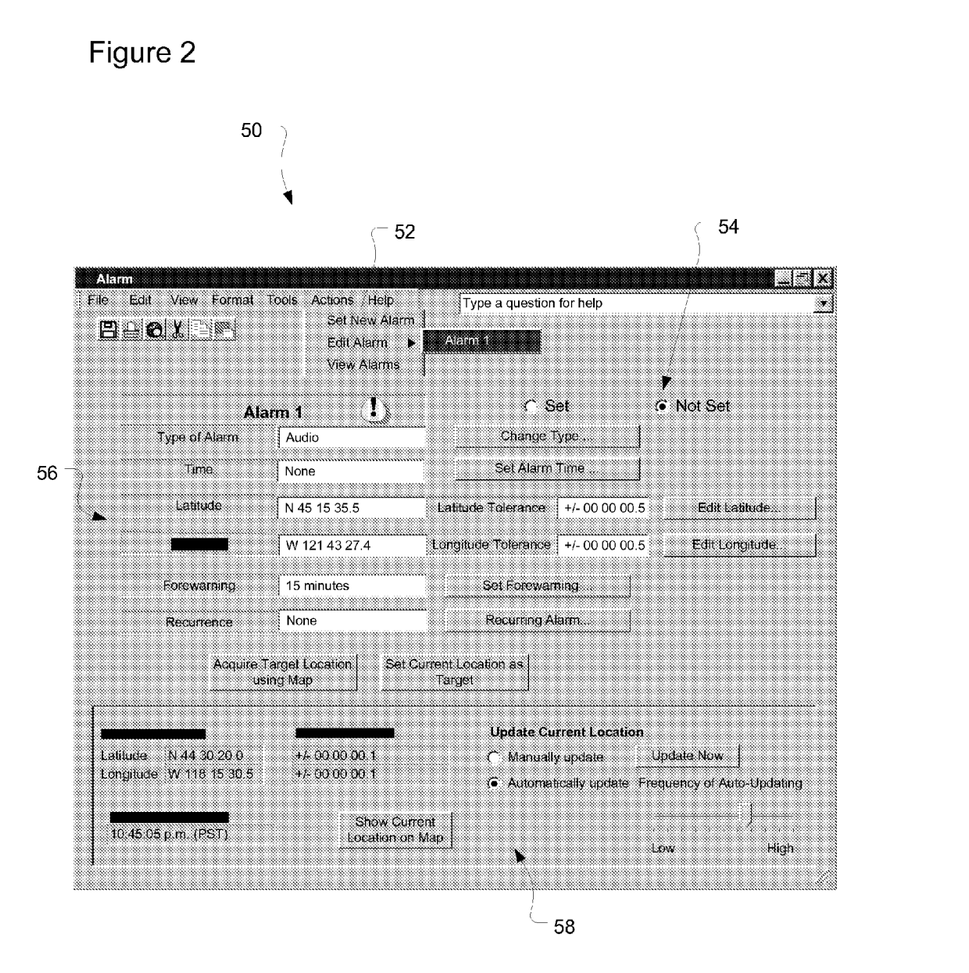
FIG. 2 is a depiction of an alarm application interface enabling editing of an alarm profile.
Figure 3:
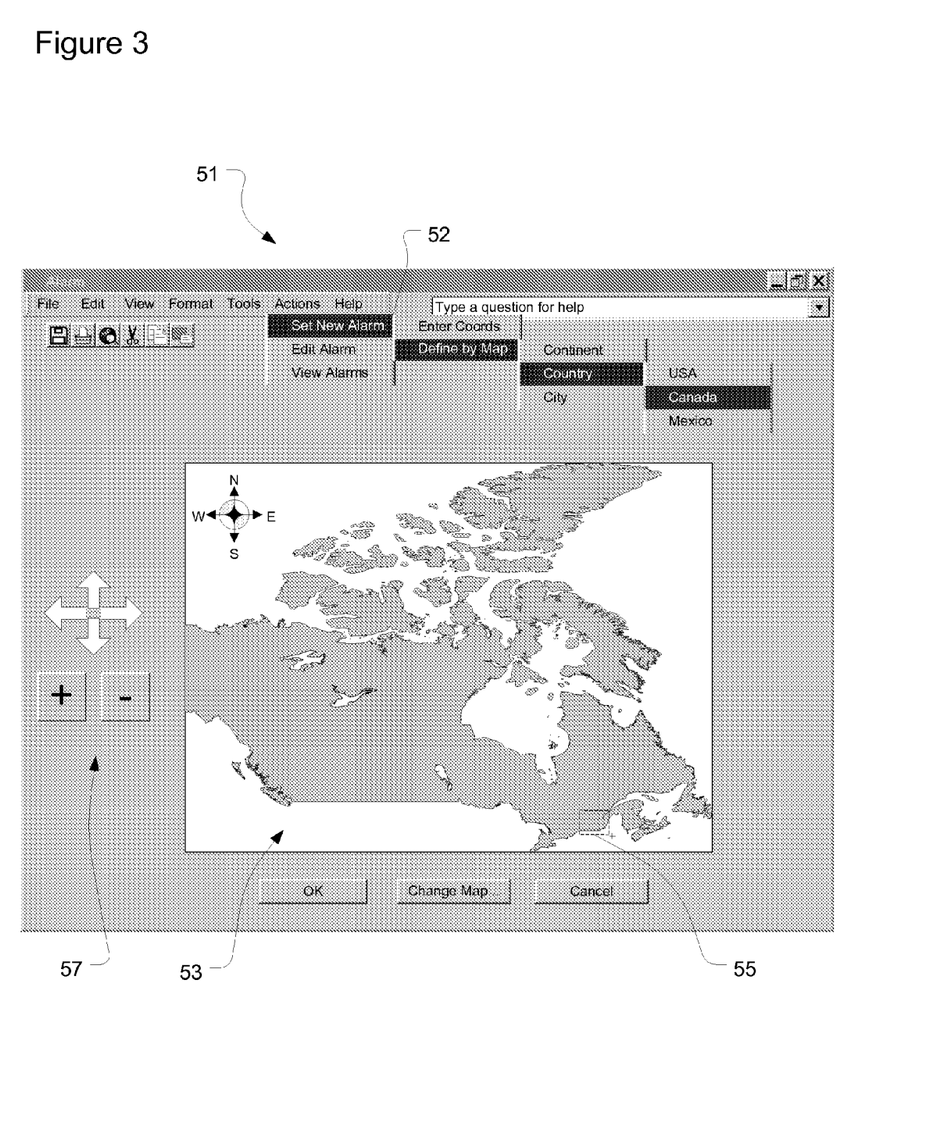
FIG. 3 is a depiction of an alarm application interface that displays a map to enable the user to set a new alarm.
Figure 4:
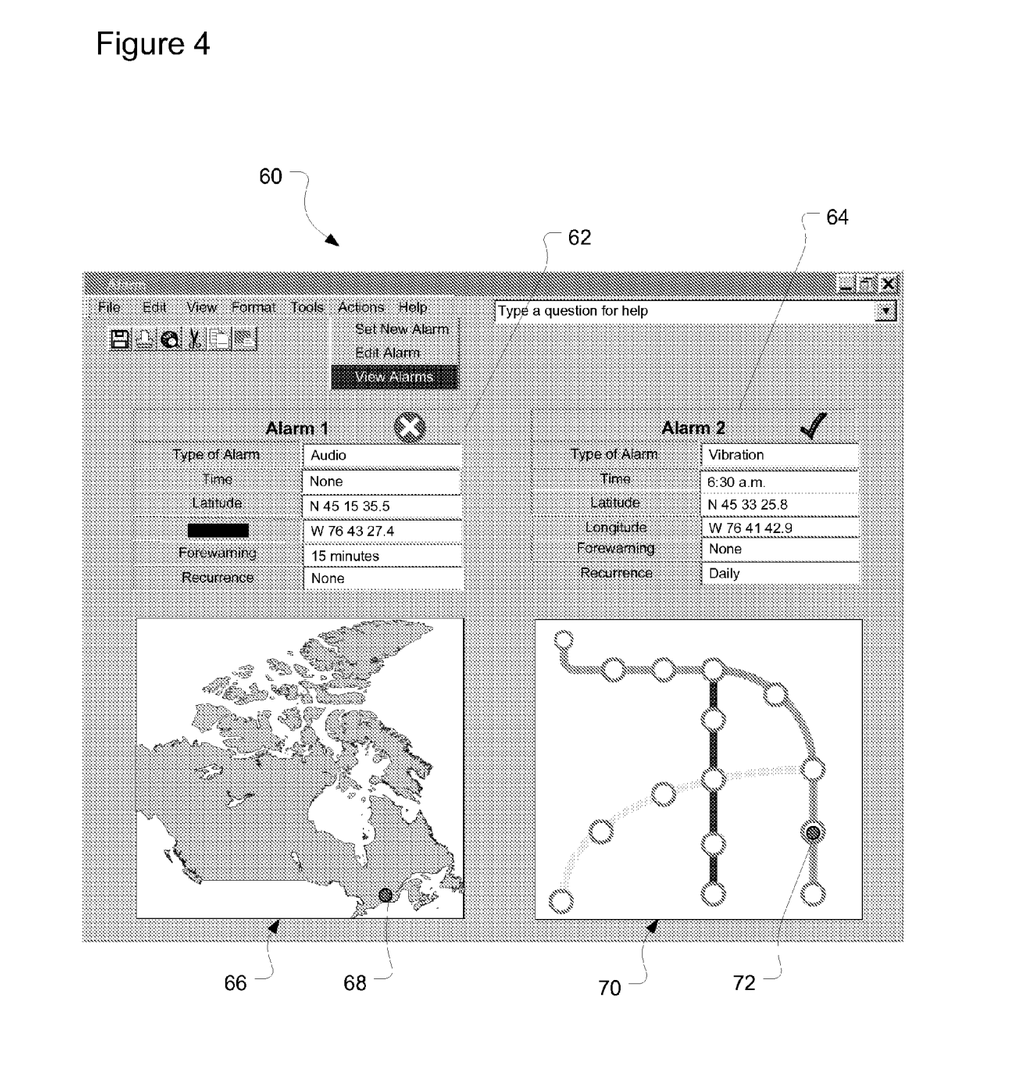
FIG. 4 is a depiction of an alarm application interface enabling viewing if alarm profiles.

FIGS. 2 to 4 depict, by way of example only, interfaces of the alarm application 34 which can be displayed on the graphical user interface 28 of the device. In the particular embodiment shown in FIG. 2, an alarm application interface 50 has a plurality of pull-down menus 52 enabling the user to set, edit, and view one or more alarms. In this particular example, the user is editing an alarm profile named "Alarm1". An on/off toggle switch 54 enables the user to arm the alarm ("Set") or disable the alarm ("Not Set"). If the alarm is not yet enabled or armed, i.e. if the user has not yet clocked on the "Set" side of the toggle, then an exclamation mark icon is displayed to warn the user that the alarm has not yet been set (or armed).

In the particular example shown in FIG. 2, the interface 50 provides a number of editable fields 56 that enable the user to specify the type of alarm (e.g. audio or vibration, and optionally to choose the specific type of sound from a selection of beeps, bells, and ring tones). Furthermore, in a variant, the user can specify that the alarm be a "soft alarm", i.e. an alarm whose sound volume or vibration intensity gradually increases after it has been triggered. Thus, the gradually increasing "soft alarm" is minimally intrusive when set off on a train, bus or other public place but is increasing insistent so as to ensure that the user is roused even from a deep slumber.

The interface 50 can furthermore enable the user to specify a target time for triggering the alarm and/or a target location for triggering the alarm. The target location can be specified by entering coordinates of latitude and longitude in the format of degrees, minutes and seconds (where the seconds are expressed in terms of tenths of a second) or in any another equivalent format.

In addition, as shown in FIG. 2, the user can specify a "distance tolerance" (or more particularly a latitude tolerance and a longitude tolerance), which defines a range within which the alarm application will consider the current location to match the target location. The interface 50 also has a field for a forewarning time and a corresponding button for setting the forewarning time. The forewarning time enables the user to specify that the alarm should be triggered a specific period of time prior to the event, which in this case is the arrival of the device (and user) at the target location. For example, if a user is napping on a commuter train, he can set the alarm to go off when he is two minutes from the station where he wants to get off. To determine the forewarning time, the alarm application compares the current and target locations and computes a rate of convergence between the current and target locations to thereby predict a convergence time and thus to determine when to trigger the alarm in order to provide the forewarning time specified by the user.

Furthermore, in the embodiment shown in FIG. 2, the interface 50 also has a field for specifying whether the alarm is a recurring alarm (e.g. a daily wake-up time). As further depicted in FIG. 2, the interface 50 has a button for enabling the user to acquire the target location using a map.

As depicted in FIG. 3, when the user wishes to acquire a target location using a map, the application can display a map on a map interface 51. The user can select either a city map (or street map), country (or regional) map or continental map from the pull-down menus 52. In this example, the user has selected a map of Canada which the application then displays in a map window 53 on the interface 51. To define the target location, the user would then graphically enclose a geographical zone 55 by clocking and dragging a box around the target location (or target zone) as depicted in FIG. 3. Alternatively, the user could point and clock to a spot on the map. In order to facilitate the finding of a specific location on the map, the interface 51 provides map manipulation functions 57 which include both a zoom (the + button and − button) and four arrows for displacing the map left and right or up and down.

In one variant, the target location can be obtained from an address in a contact list. The address is then imported into a mapping application such as BlackBerry Maps™ or Google Maps™ which then determine the location coordinates.

In another variant, specific locations (or points of interests, or POI) on the map corresponding to cities or other urban areas, landmarks, bus or train stations, airports, etc. could be "point-and-click selectable" so that when the cursor passes over one of those map locations, the city, station or landmark is highlighted. The user can then simply click on the particular city, station or landmark in order to select it as the target location.

The position data for each of these locations could be stored in the database of predetermined positions 36 in the memory of the device. In the position database 36, each predetermined position would have a name (or label) to enable the user to readily identify the location or geographical entity (e.g. the name of the subway station, airport, landmark, city, town, neighbourhood, street corner, shopping mall, etc.) In addition, the position database would store position data as coordinates of latitude and longitude (e.g. N45 15 35.5 W 121 43 27.4)

For each location, a preconfigured distance tolerance could be stored depending on the nature of the geographical entity at the chosen location. Thus, for example, a large distance tolerance would be specified for a city, but a tight distance tolerance would be specified for a train station. In one embodiment, the distance tolerance can be edited by the user to provide the desired range within which the alarm will be triggered. For example, the user can specify that the alarm will trigger only when the user and wireless device reach the downtown core or particular location or zone in the city.

Referring back to the example shown in FIG. 2, the interface 50 can further include a button to set the current location as the target location. This imports the position data (e.g. the instantaneous GPS readings) and sets these as the target location. As a variant, the user can capture GPS readings for a number of locations and then use the various GPS readings to define a zone within which the alarm will be triggered. Furthermore, the alarm application can be configured to enable the user to define, name and edit a plurality of target locations by capturing position data at each respective location. For example, if the user rides a commuter train, he can capture GPS readings at a number of stations along the line to thereby define a plurality of target locations. The user can then set alarms for one or more of these target locations and, furthermore, can name and edit each alarm profile. For example, the user might capture GPS readings for the station nearest his home and the station nearest his workplace.

As depicted in FIG. 2, the interface 50 further includes a current location panel 58 showing the current location (position data) of the device in terms of latitude and longitude. Optionally, the interface 50 can show the estimated error in the position data. Depending on the sensitivity of the GPS receiver, the GPS readings are known to be accurate to within a distance of a few meters. This error can also be displayed as a decimal or fraction of a second. The current location panel 58 can also include an Update Current location feature which enables the user to either manually update the current location (by causing the device to take new GPS readings) or to automatically updated the position data at a frequency specified by the user. The current location panel 58 can also display the current local time, which is useful if the user has specified both a target time and a target location for triggering the alarm. Finally, the current location panel 58 also includes a button that enables the user to show the current location on the map, e.g. plotting the current location on the map shown in FIG. 3. This allows the user to visualize his current location relative to the target location.

In one embodiment, the device can store a plurality of location-dependent alarms ("alarm profiles") corresponding to a variety of target locations. In addition, the device can enable the user to prescribe target times for each of these target locations. Accordingly, the user can specify that is he is at a certain location at a certain time, an alarm should be triggered, and that if he is at another location at another time, then another alarm should be triggered. In other words, the device enables the user to set a first alarm to be triggered at a first time when the device is positioned at a first location and further enables the user to set a second alarm to be triggered at a second time when the device is positioned at a second location. Thus, the device will trigger the first alarm when the device is positioned at the first location and an internal clock of the device reaches the first time or the device triggers the second alarm when the device is positioned at the second location and the internal clock reaches the second time.

FIG. 4 depicts another interface 60 of the alarm application that enables the user of the wireless device to view all (or a subset of) the alarm (or alarm profiles). As shown in FIG. 4, only two alarm profiles are displayed in this example interface although it should be understood that variants of this interface could accommodate a different number of alarm profiles (showing different alarm attributes or showing them in a different manner or layout).

By way of example only, a first alarm profile 62 named "Alarm1" has a red X icon beside it to indicate that the alarm is not set. The profile 62 of Alarm1 shows the type of alarm (e.g. audio or vibration), whether a target time is also required to be reached before the alarm is triggered, the target location in terms of latitude and longitude, the forewarning time (if any) and whether the alarm is recurring. The second profile (Alarm2) 64 has a check mark to indicate that the alarm is armed (set) and will be triggered on satisfaction of both the specified target time of 6:30 a.m. and the target location (again shown in terms of latitude and longitude). Alarm 2 also has forewarning and recurrence fields. In this example, Alarm 2 will be triggered every day at 6:30 a.m. provided that the device is positioned in the target location. Alarm1 is a one-time alarm (no recurrence) and is not dependent on time. Therefore, Alarm 1 will be triggered 15 minutes before the device arrives the target location.

As further depicted in FIG. 4, the "view alarms" interface 60 can display a map 66 and the target location 68 on the map. For example, the map could be a street map, a city map, a regional map, a country map (as shown by way of example only), or a continental map. Regardless of the type of map, the map can be zoomed in or out or moved up and down and side to side. The interface 60 can also display a transportation-network map 70, e.g. a map of a subway or metro line or of a bus or a commuter train line, as shown in this example. The interface can then plot or display the target location 72 (e.g. the particular commuter train station or subway station where the user wants to be woken or alerted).

Figure 5:
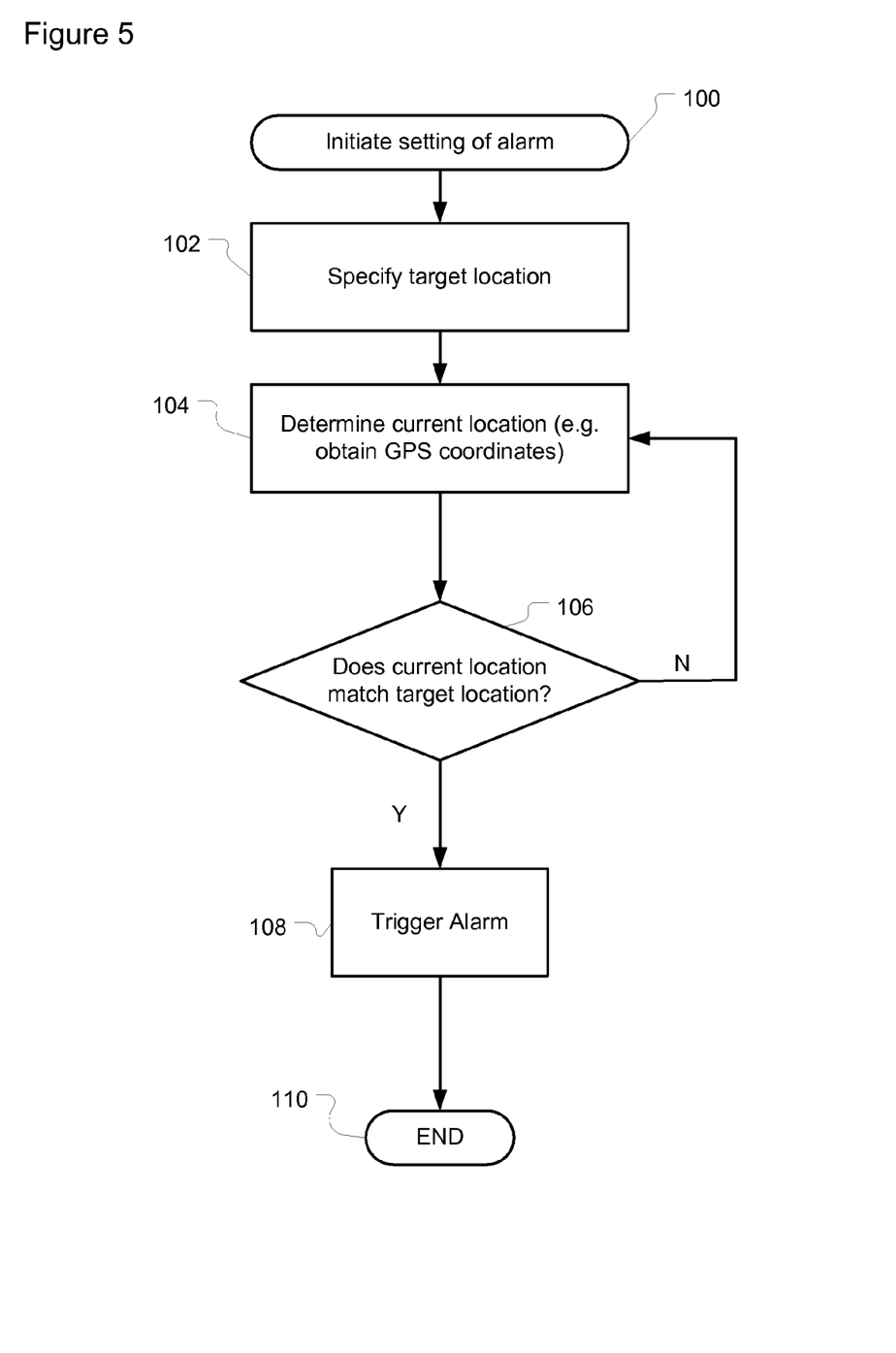
FIG. 5 is a first flowchart depicting a method of alerting a user of a wireless device using a location-dependent alarm.

Another aspect of the present technology relates to methods of alerting a user of a wireless device using a location-dependent alarm. FIG. 5 is a first flowchart depicting a first method. The user initiates the setting of the alarm (step 100), usually by launching the alarm application. The user then specifies the target location (step 102), for example by entering coordinates of latitude and longitude, by selecting a predetermined position from the database of predetermined positions, or by indicating the target location on a map displayed on the GUI of the device. Once the alarm is set, the device will begin periodically or intermittently determine the current location, usually by taking GPS readings (step 104). The application the compares the current location with the target location (step 106). If the current location matches the target location (within the prescribed distance tolerance, that is), then the device (i.e. the alarm application) will trigger the alarm (step 108). The alarm is then shut off by the user or shuts off automatically after a prescribed time (step 110). Otherwise, if the current location does not match the target location, then the device will continue to obtain subsequent GPS readings on an ongoing basis until the current location matches the target location (or until the alarm is disabled). Thus, the alarm application continually monitors the current location of the device until the current and target locations match.

Figure 6:
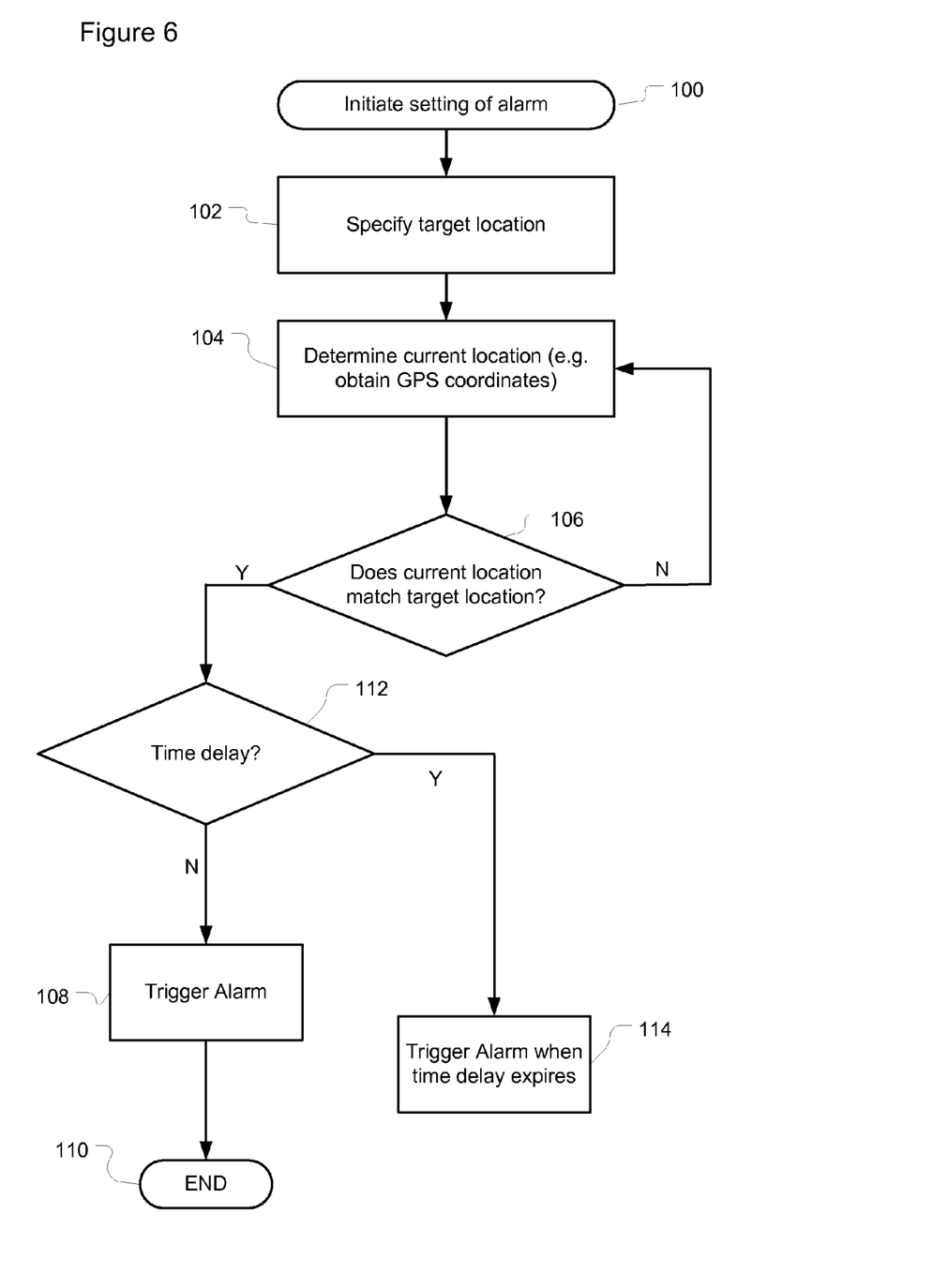
FIG. 6 is a second flowchart depicting a method of alerting a user of a wireless device using a location-dependent alarm.

FIG. 6 is second flowchart showing a variant of the foregoing method. In the embodiment presented in FIG. 6, the alarm is only triggered if the current location matches the target and the current time matches the target time (or, alternatively, if the time delay has elapsed). Thus, after the step 106 of determining whether the current location matches the target location, the method includes step 112 of determining whether the user has specified a target time for time delay). If no, then the alarm is triggered right away (step 108). If yes, then the alarm is only triggered once the time delay has expired (step 114) or, alternatively, when the current time (as measured by the internal clock of the device) matches the target time.

Figure 7:
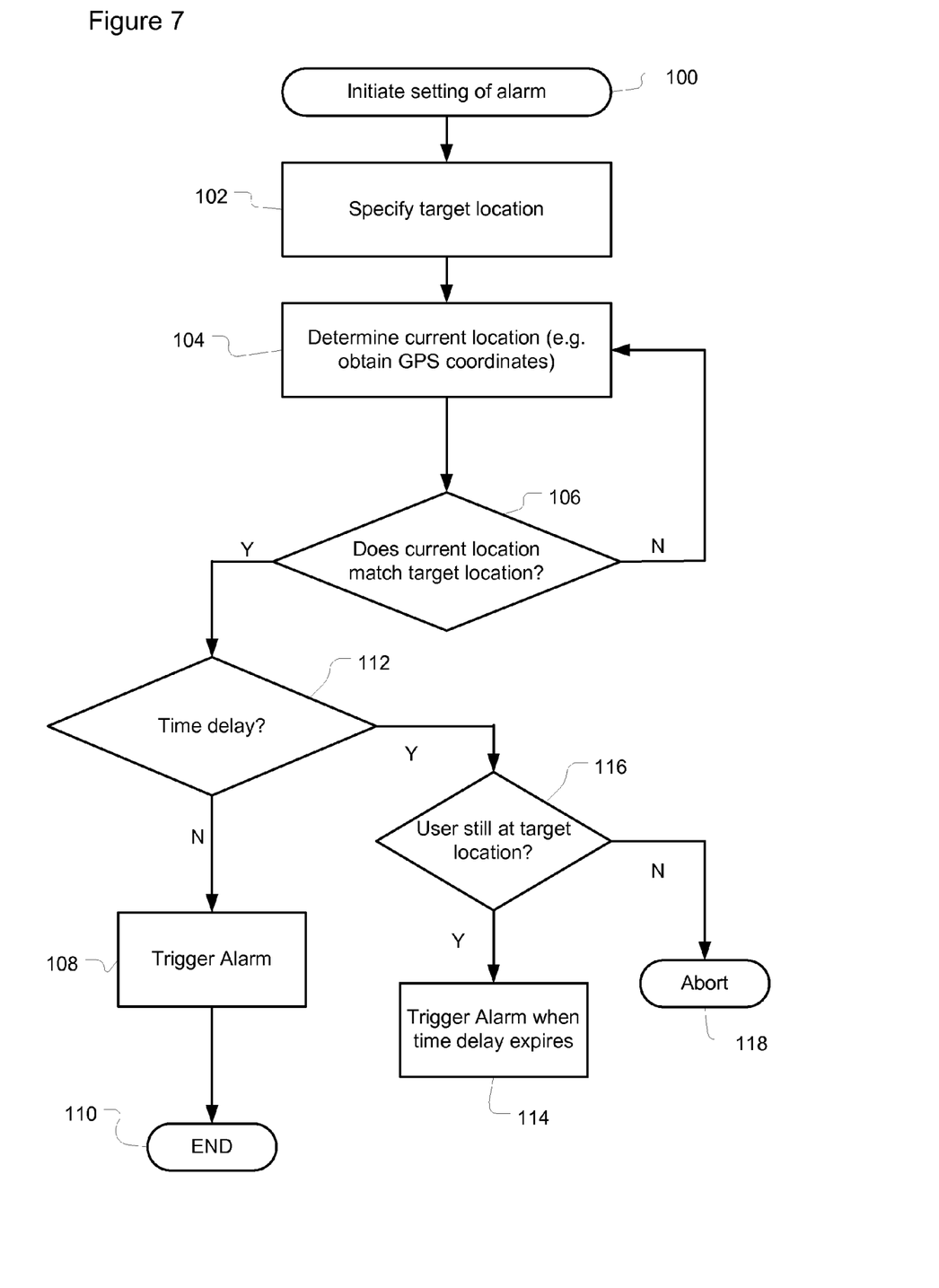
FIG. 7 is a third flowchart depicting a method of alerting a user of a wireless device using a location-dependent alarm.

FIG. 7 is a third flowchart depicting another variant of the method. In the embodiment shown in FIG. 7, the device will only set off the alarm if the device remains at the target location. In other words, if the device moves to the target location and a time delay is specified, the device will abort the triggering of the alarm if the device strays away from the target location. As shown in FIG. 7, after the step 112 of determining whether there is a time delay specified by the user, the device will then reassess whether the device is still at the target location (step 116). If the device is still at the target location, then the alarm will be triggered when the time delay expires or when the current time matches the target time (step 114). On the other hand, if the device is not longer at the target location, the device will abort the triggering of the alarm (step 118).

A variation on the foregoing method could entail triggering the alarm even if the device has departed from the target location, or triggering the alarm is the device is still within a certain distance of the target location (where the distance is greater than the original distance tolerance used for determining if the current and target locations match).

EXAMPLE #1

Napping on the Commuter Train

In this first example, consider a user of a GPS-enabled wireless communication device who wishes to nap on a commuter train but who is concerned about sleeping past the station where he wants to get off. In the past, he would have had to set his alarm based exclusively on the predicted time of arrival at his station (i.e. based on notoriously inaccurate train schedules). To the user's chagrin, if the commuter train is delayed (or if it arrives early), the alarm will either sound too early (or too late). With the presently described technology, however, the user could set the alarm to be triggered a certain period of time (the "forewarning time") prior to arrival at the desired station (the "target location" in this example). The device would then compute the average speed of the train and thus determine when to trigger the alarm in order to provide the user with the prescribed amount of forewarning. The user can enter the position data (GPS coordinates) for the station by taking his own GPS reading when he passes through the station, by selecting the station from a database of predetermined positions, assuming the station is in the list of known positions, by entering the latitude and longitude coordinates directly into the device, or by selecting the target location using a map displayed on the GUI of the device. Regardless of the method used for specifying the target location, the user can then set the device to trigger the alarm when the train arrives at the station, or optionally, a few minutes earlier to provide suitable forewarning. A furthermore advantage of this technology is that the device will still trigger the alarm even if the user takes an earlier or later train to the same destination. In other words, if the user decides to sleep in and take the 9:15 train to work rather than the usual 8:15 train, the user need not reset the alarm because the alarm is triggered solely by the location coordinates of the destination.

As a variation, consider the case of the weary commuter who wants to nap on the train both going to work in the morning and on the way home in the evening. In this case, the user would capture GPS coordinates (or otherwise supply the position data) for the train station where he intends to get off in the morning and the train station where he intends to get off in the evening. To prevent the alarm from sounding when he arrives at the station to get on the train, the user would also need to specify a time, or more realistically, a time range for each alarm. In other words, the user would specify that the first alarm (the morning alarm) would only go off if the current location matches the target location and the current time is between, say, 6:00 a.m. and 9:00 a.m. Likewise, for the return trip home, the user would specify, in addition to the target location, that the current time would have to be between, say, 5:00 p.m. and 8:00 p.m. Accordingly, the device would only sound the wake-up alarm in the morning when the user is arriving at the destination station near his workplace and would only sound the alarm in the evening when he arrives at the station near his home.

EXAMPLE #2

Different Wake-up Times for Different Places

In this second example, a GPS-enabled wireless communications device can be used to set a first alarm that is triggered at a first time if the device is positioned in a first location or at a second time if the device is positioned in a second location. For this example, assume that the user of the wireless device occasionally sleeps at a different location that is closer to his place of work. In that case, the user only needs to get up at, say, 7:00 a.m. whereas he usually needs to get up at 6:00 a.m. when he sleeps at home because the commute from home to work is that much farther. Accordingly, the user sets a first alarm for 6:00 a.m. and sets the first target location to be his home. The user then sets a second alarm for 7:00 a.m. and sets the second target location to be the place where he sleeps occasionally. The user would specify both alarms to have a daily recurrence (or a "weekday only" recurrence). The device would then automatically detect where is sleeping and would then trigger the corresponding alarm, thus providing a wake-up alarm appropriate the location where the user is sleeping.

In the foregoing embodiments, the alarm is triggered to alert the user of the wireless device by setting off a sound, vibration or other alarm indicator. However, in another embodiment, the alarm could be triggered to alert another person, i.e. a third party ("an alarm recipient") who is remote from the wireless device. For example, instead of (or in addition to) the sounding of the alarm (or the causing the device to vibrate), the wireless device could communicate the alarm to the alarm recipient, e.g. send an e-mail alert to another person to indicate that the user of the wireless device has arrived at the target location. By way of example only, the user could program the alarm to cause the wireless device to send an e-mail alert (or a pre-recorded voice alert) to a family member, friend, taxi or limousine service to confirm a pre-arranged pick-up at a train or bus station, or at an airport, shortly before the user arrives at that destination. The e-mail message could include the user's current location or estimated time of arrival at the destination so that the recipient could adjust their plans accordingly. The e-mail message could also include an option to enable the user to query the recipient to confirm that they will be at the pick-up on time, thus prompting a reply from the recipient such as "YES, I WILL BE THERE ON TIME"; "NO, I WILL NOT BE THERE"; or "I WILL BE LATE" (the latter selection requiring the recipient to type a brief explanatory message.

Although the GPS-triggered alarm described in the foregoing paragraphs is preferably incorporated into a wireless communications device, the GPS-triggered alarm can also be incorporated into a PDA or MP3 player, even if the PDA or MP3 player is not wireless-enabled.

The embodiments of the invention described above are intended to be exemplary only. The scope of the invention is therefore intended to be limited solely by the scope of the appended claims.

A portion of the disclosure of this patent document may contain material that is subject to copyright protection. The copyright owner has no object to the facsimile reproduction by anyone of the patent document or patent disclosure, as it appears in the Patent and Trademark Office patent file or records, but otherwise reserves all copyright.

The invention claimed is:

1. A method, performed by a wireless communications device, of providing an alert, the method comprising:
   receiving input specifying a target location, a time range and a forewarning time;
   determining a current location of the device;
   comparing the current location of the device with the target location; and
   if a current time matches the time range, triggering an alarm in the device based on the forewarning time specified using the device and based on a rate of convergence between the current location and the target location, the rate of convergence being computed by the device from at least one speed measurement,
   wherein the time value is a time delay, the method further comprising, after expiration of the time delay, determining that the current location still matches the target location prior to triggering the alarm.

2. The method as claimed in claim 1 comprising enabling the forewarning time to be modified by user input received by the device.

3. The method as claimed in claim 1 comprising enabling the target location to be defined by graphically enclosing a zone on a map displayed on a graphical user interface of the device.

4. The method as claimed in claim 1 comprising enabling selection of the target location from a plurality of predetermined positions, each predetermined position having both a name and associated position data.

5. The method as claimed in claim 1 wherein determining the current location of the device comprises receiving and processing signals from Global Positioning System (GPS) satellites.

6. The method as claimed in claim 1 wherein the time value is a target time, the method further comprising determining that the target time matches the current time prior to triggering the alarm.

7. A wireless communications device having a location-dependent alarm, the wireless device comprising:
   an input device for enabling setting of the alarm by specifying a time range and a target location for triggering the alarm and by specifying a forewarning time;
   a position data module for generating position data representative of a current location of the device; and
   a processor for comparing the position data with the target location to compute a rate of convergence for comparing the time range and a current time and for triggering the alarm in the device when the device approaches the target location, wherein the alarm comprises an alarm application for causing the alarm to be triggered if the current time matches the time range and based on the forewarning time specified using the device and based on the rate of convergence between the current and target locations to thereby predict a convergence time and thus to determine when to trigger the alarm in order to provide the forewarning time, wherein the rate of convergence is computed from at least one speed measurement,
   wherein the time value is a time delay and the processor is for, after expiration of the time delay, determining that the current location still matches the target location prior to triggering the alarm.

8. The wireless communications device as claimed in claim 7 wherein the position data module is a Global Positioning System (GPS) receiver for generating GPS position data for the current location of the device.

9. The wireless communications device as claimed in claim 7 wherein the alarm comprises an alarm application stored in a memory of the device and executable by the processor for defining the target location by graphically enclosing a zone on a map displayed on a graphical user interface of the device.

10. The wireless communications device as claimed in claim 7 wherein the alarm comprises a position database for storing a plurality of predetermined positions, each predetermined position having both a name and associated position data.

11. The wireless communications device as claimed in claim 7 wherein the time value is a target time and the processor is for determining that the target time matches the current time prior to triggering the alarm.

* * * * *